United States Patent [19]

Sabel

[11] Patent Number: 4,543,845
[45] Date of Patent: Oct. 1, 1985

[54] SHIFTING DEVICE FOR A TRANSMISSION

[75] Inventor: Gustav Sabel, Cologne, Fed. Rep. of Germany

[73] Assignee: Ford Motor Company, Dearborn, Mich.

[21] Appl. No.: 442,324

[22] Filed: Nov. 17, 1982

[30] Foreign Application Priority Data

Nov. 25, 1981 [DE] Fed. Rep. of Germany ....... 3146614

[51] Int. Cl.$^4$ ............................................. G05G 5/10
[52] U.S. Cl. .................................. 74/477; 74/473 R
[58] Field of Search .............................. 74/477, 473 R

[56] References Cited

U.S. PATENT DOCUMENTS 4,222,281  9/1980  Mylenek ........................... 74/477 X
4,307,624  12/1981  Mylenek ............................. 74/477
4,320,670  3/1982  Kawamoto ........................... 74/477
4,377,093  3/1983  Janson ................................ 74/477

Primary Examiner—Allan D. Herrmann
Attorney, Agent, or Firm—Frank G. McKenzie; Donald J. Harrington

[57] ABSTRACT

A shifting mechanism for a change-speed gear has a gear-selector shaft that includes a first shift finger and a first locking wheel cooperating therewith and fixed axially in the gear housing for moving two shift forks, and a second shift finger and a second locking wheel cooperating therewith and fixed axially in a gear box extension for moving a third shift fork located in the gear box extension. The axial fixing of the second locking wheel is arranged so that it is guided through a groove on a projection secured to a cover, which is adjustably fixed in the axial direction on the gear box extension by way of elongated holes and screws.

4 Claims, 3 Drawing Figures

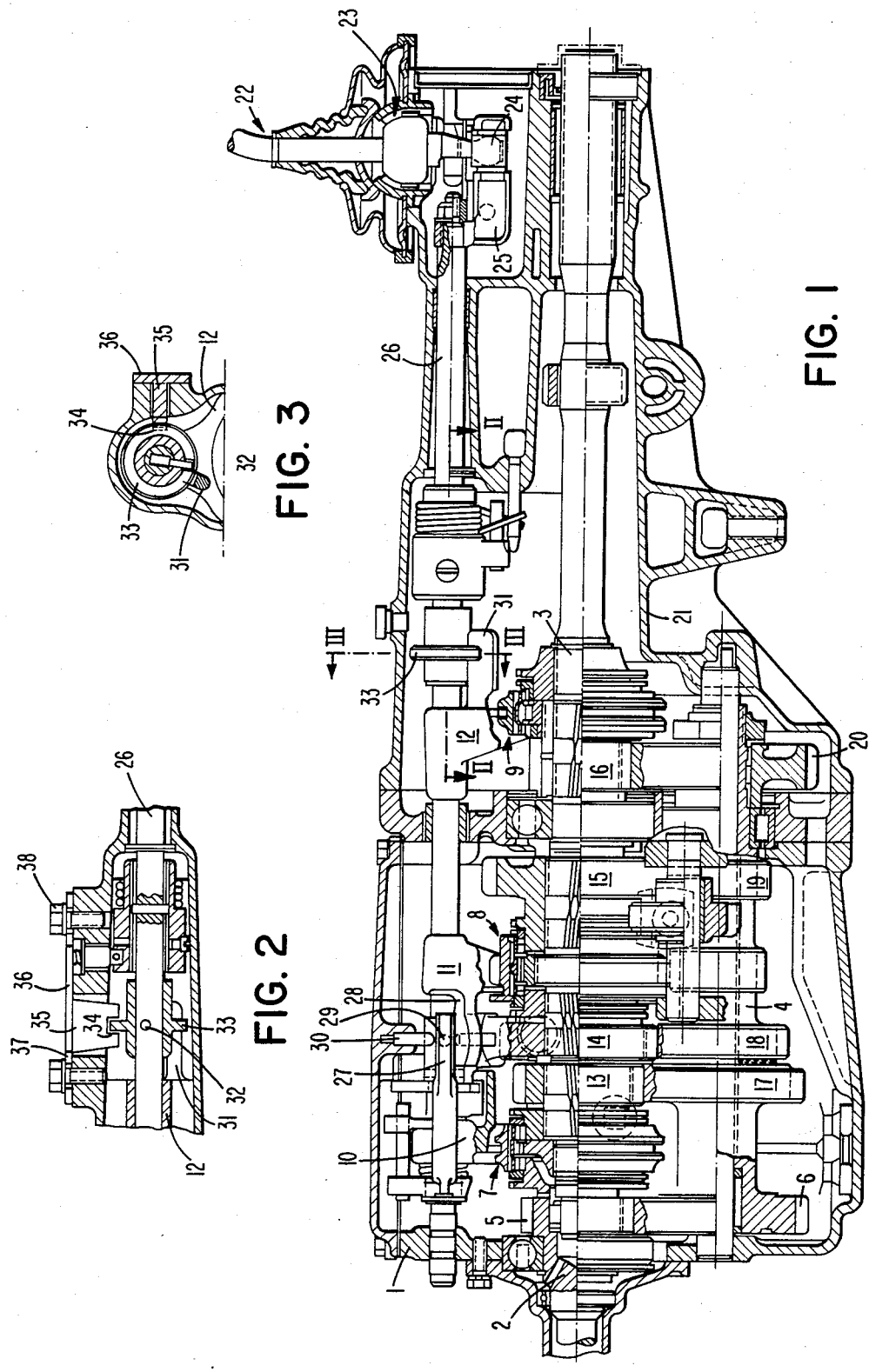

SHIFTING DEVICE FOR A TRANSMISSION

BACKGROUND OF THE INVENTION

1. Field of the Invention

This invention relates to a shifting mechanism for a manual change-speed transmission, in particular for use in motor cars.

2. Description of the Prior Art

A shifting device of this type, known from the European Pat. Specification No. 00 35 223, has two axially spaced shift-finger locking-wheel systems disposed on a single gear-selector shaft. Accumulative tolerances on the gear-selector shaft, on the one hand, and on the housing parts connected to one another, on the other hand, may lead to difficulties and failure in shifting.

Such difficulties could, of course, be overcome by generously dimensioning the tolerances of the cooperating parts, but this would lead to the preselection and shifting movements of the gear-selector being insufficiently performed and indefinite.

The object of the invention is, therefore, to provide an improved shifting mechanism such that, despite the accumulative tolerances which occur, trouble-free shifting among all the gear ratios is possible.

This object is attained according to the invention in a shifting mechanism having a first selector finger carried by a gear-selector shaft for engaging one or the other of two shift forks and a second selector finger carried by the gear-selector shaft for engaging a third shift fork. The selector fingers cooperate with respective locking wheels that are secured axially to separate, connected gear box housings to prevent axial movement of the shift forks other than the fork selected for movement. At least one of the locking wheels is fixed to its associated gear box housing by way of an axially adjustable attachment.

Because the axial fixing of the second locking wheel may be adjusted axially, the accumulative tolerances occurring on the gear-selector shaft and accumulative tolerances different from these tolerances on the housing parts are compensated in a simple manner that permits trouble-free shifting of all the gears.

BRIEF DESCRIPTION OF THE DRAWING

FIG. 1 is a vertical longitudinal cross section through a change-speed transmission with a shifting mechanism made according to this invention.

FIG. 2 is a cross section taken along the plane II—II in FIG. 1.

FIG. 3 is a cross section taken along the plane III—III in FIG. 1.

DESCRIPTION OF THE PREFERRED EMBODIMENT

In FIG. 1 a change-speed transmission for use in motor cars is shown, in which an input shaft 2, a coaxially adjoining output shaft 3 and a constant mesh gear 4 arranged parallel thereto are disposed in a gear box housing 1. The input shaft 2 is in driving engagement with an input gear wheel 6 of the constant mesh gear 4 by way of an input gear wheel 5. On the output shaft 3 are disposed two double-acting synchromesh unit 7 and 8 and a single-acting synchromesh unit 9, which may be brought selectively into engagement by way of shift forks 10, 11 or 12 with gear wheels 5, 13, 14 and 15 or 16. Gears 13–16 loosely rotate on the output shaft and are in constant mesh with corresponding gear wheels 17, 18, 19 and 20, respectively, on the constant mesh gear 4.

Either the first or second gear ratios can be produced by way of synchromesh unit 8 by moving shift fork 11. Either the third gear or a direct, fourth gear ratio can be produced by way of the synchromesh unit 7 by moving shift fork 10. A fifth gear ratio can be produced by way of the synchromesh unit 9 by moving shift fork 12.

In a manner which is usual in the motor car industry and in gear manufacture, the elements for the first four forward gears and the usual reverse gear are arranged in a standard gear housing, while the fifth gear, which is generally provided only optionally, is disposed in a gear box extension housing 21 at the end of which the gear shift lever 22 is mounted in a conventional ball bearing 23. The lower arm 24 of the gear shift lever 22 acts via a bent arm 25 upon gear selector shaft 26, which rotates for the preselection of gear planes and is axially displaceable in order to engage gears. The single gear selector shaft 26 bears essentially all the components necessary for the shifting mechanism.

The two shift forks 10, 11 for the first and second gears and the third and fourth gears, respectively, and the shift fork 12 for the fifth gear are displaceably mounted on the gear selector shaft 26. Shift forks 10 and 11 are provided with bracket arms 27 and 28 which cooperate, by means of grooves formed therein, with a shift finger 29 secured to the gear-selector shaft 26 and a locking wheel 30, which accompanies shift finger 29 and is axially fixed in the gear housing 1, in order to permit only the selected shift fork to be moved by axial displacement of shaft 26, the remaining shift forks being concurrently blocked.

In a similar way shift fork 12 is provided with a bracket arm 31 which cooperates by means of a groove with a second shift finger 32 and a locking wheel 33, which follows finger 32 and is axially fixed in the gear box extension housing 21 in order to block the engagement of the fifth gear when reverse drive or a lower gear ratio is selected.

According to the invention, the locking wheel 33 is axially fixed in a groove 34 formed in a projection 35 which is secured to a cover 36 that may be fixed in an axially adjustable position on gear box extension 21 by way of elongated holes 37 and screws 38.

The accumulative longituidinal tolerances occurring on the gear-selector shaft 26 on account of the attachment of the two shift fingers 29 and 32 and the accumulative longitudinal tolerances occurring on the housing components on account of fixing the first locking wheel 30 in the gear housing 1 and the connection thereof to the gear box extension housing 21 would, in the case of an axial arrangement of the second locking wheel 33 fixed at the beginning, give rise either to defective shifting or to an imprecise shifting guidance.

By virtue of the adjustable arrangement of the second locking wheel 33 these accumulative tolerances are compensated in a simple manner and trouble-free shifting of all the gears of the change-speed gear is insured.

Having described a preferred embodiment of my invention, which I claim and desire to secure by U.S. Letters Patent is:

1. A gear shift mechanism for a transmission comprising:
   a gear box housing;
   a gear box extension connected to the gear box housing;

a gear selector shaft rotatably mounted and axially displaceable having first and second selector fingers spaced axially from one another;

shift forks slidably mounted on the gear selector shaft adapted to be selectively engaged by the first or second selector fingers and to be moved axially after such engagement as the gear-selector shaft is moved axially;

a first locking wheel fixed to the gear box housing against axial movement, cooperating with the first selector finger to prevent axial movement of at least one shift fork that is not engaged by the first selector finger; and a second locking wheel axially adjustably fixed to the gear box extension against axial movement, cooperating with the second selector finger to prevent axial movement of a shift fork that is not engaged by the second selector finger.

2. The shift mechanism of claim 1 wherein at least one locking wheel is guided in a groove of a projection which is secured to a cover whose position is axially adjustable before being fixed by way of elongated holes and screws.

3. A gear shift mechanism for a transmission comprising:

a gear box housing;

a gear box extension connected to the gear box housing;

an input shaft having an input gear formed thereon;

an output shaft aligned with the input shaft carrying gear wheels thereon;

a constant mesh gear shaft having multiple gears in continuously meshing engagement with the gear wheels of the output shaft for forming gear pairs;

multiple synchromesh units for selectively driveably connecting one gear of each gear pair to the shaft on which said gear is carried;

a gear selector shaft having shift forks slidably mounted thereon, a first selector finger located within the gear box housing for selectively engaging some of the shift forks, a first locking wheel fixed against axial movement to the gear box housing, a second selector finger located within the gear box extension for selectively engaging a shift fork not engageable by the first selector finger and a second locking wheel in the gear box extension, either of the locking wheel being axially adjustably fixed against axial movement.

4. The shift mechanism of claim 3 wherein one locking wheel is guided in a groove of a projection which is secured to a cover whose position is axially adjustable before being fixed by way of elongated holes and screws.

* * * * *